United States Patent [19]

Barns et al.

[11] Patent Number: 4,957,357

[45] Date of Patent: Sep. 18, 1990

[54] MULTIPLE AXIS RETICLE

[75] Inventors: Chris E. Barns, Mt. View; William D. Gunter, San Jose, both of Calif.

[73] Assignee: The United States of America as represented by the Administrator of the National Aeronautics and Space Administration, Washington, D.C.

[21] Appl. No.: 418,374

[22] Filed: Oct. 6, 1989

[51] Int. Cl.$^5$ .................... G02B 23/00; F41G 11/00
[52] U.S. Cl. ........................... 350/576; 33/261
[58] Field of Search ............. 350/565, 566, 576; 33/233, 245, 246, 253, 261, 297, 289, 299

[56] References Cited

U.S. PATENT DOCUMENTS

| | | | |
|---|---|---|---|
| 730,016 | 6/1903 | Hein | 33/297 |
| 1,189,422 | 7/1916 | Bodmer | 33/290 |
| 2,466,724 | 4/1949 | Meyer | 33/298 |
| 3,545,086 | 12/1970 | Brill et al. | 33/261 |
| 4,380,876 | 4/1983 | Strassburg | 33/297 |

*Primary Examiner*—Bruce Y. Arnold
*Assistant Examiner*—Ronald M. Kachmarik
*Attorney, Agent, or Firm*—Darrell G. Brekke; John R. Manning

[57] ABSTRACT

A reticle (10) permits the alignment of three orthogonal axes (X, Y and Z) that intersect at a common target point (30). Thin, straight filaments (12, 14 and 16) are supported on a frame (20). The filaments are each contained in a different orthogonal plane ($S_{xy}$, $S_{xz}$, and $S_{yz}$) and each filament intersects two of the three orthogonal axes. The filaments, as viewed, along the frame axis (22), give the appearance of a triange (24) with a V (17) extending from each triangle vertex (25, 26, and 27). When axial alignment is achieved, the filament portions adjacent to a triangle vertex are seen (along the axis of interest) as a right-angle cross, whereas these filament portions are seen to intersect at an oblique angle when axial misalignment occurs. The reticle is open in the region near the target point leaving ample space for alignment aids such as a pentaprism 54 or a cube mirror 41.

19 Claims, 4 Drawing Sheets

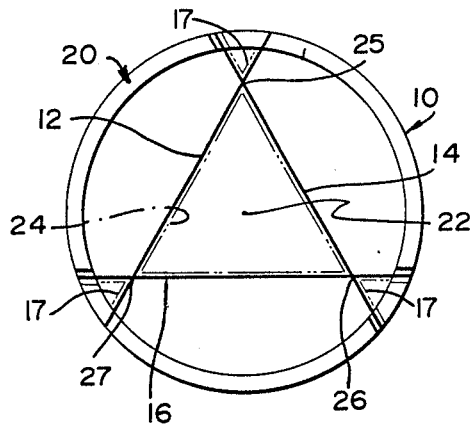
FIG.1
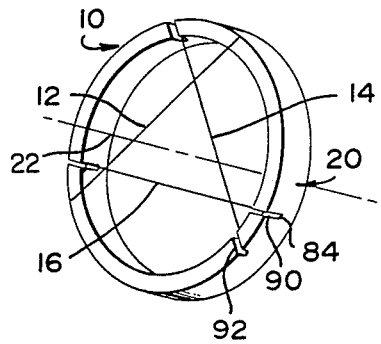
FIG.2
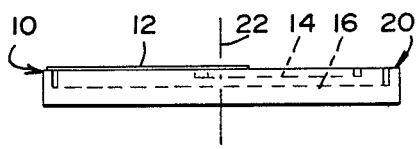
FIG.3
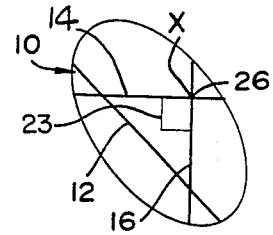
FIG.5
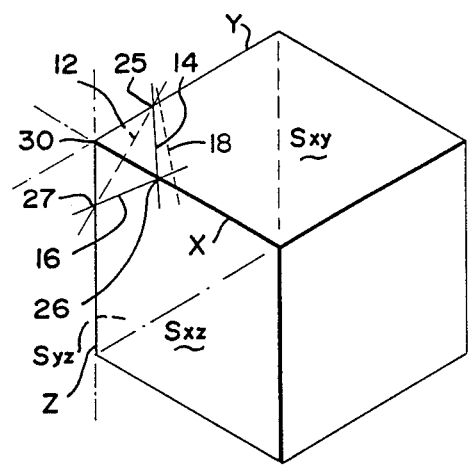
FIG.4
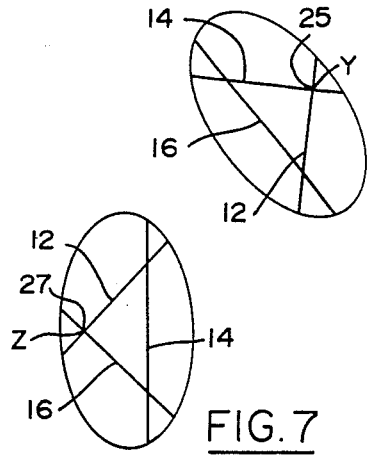
FIG.6
FIG.7

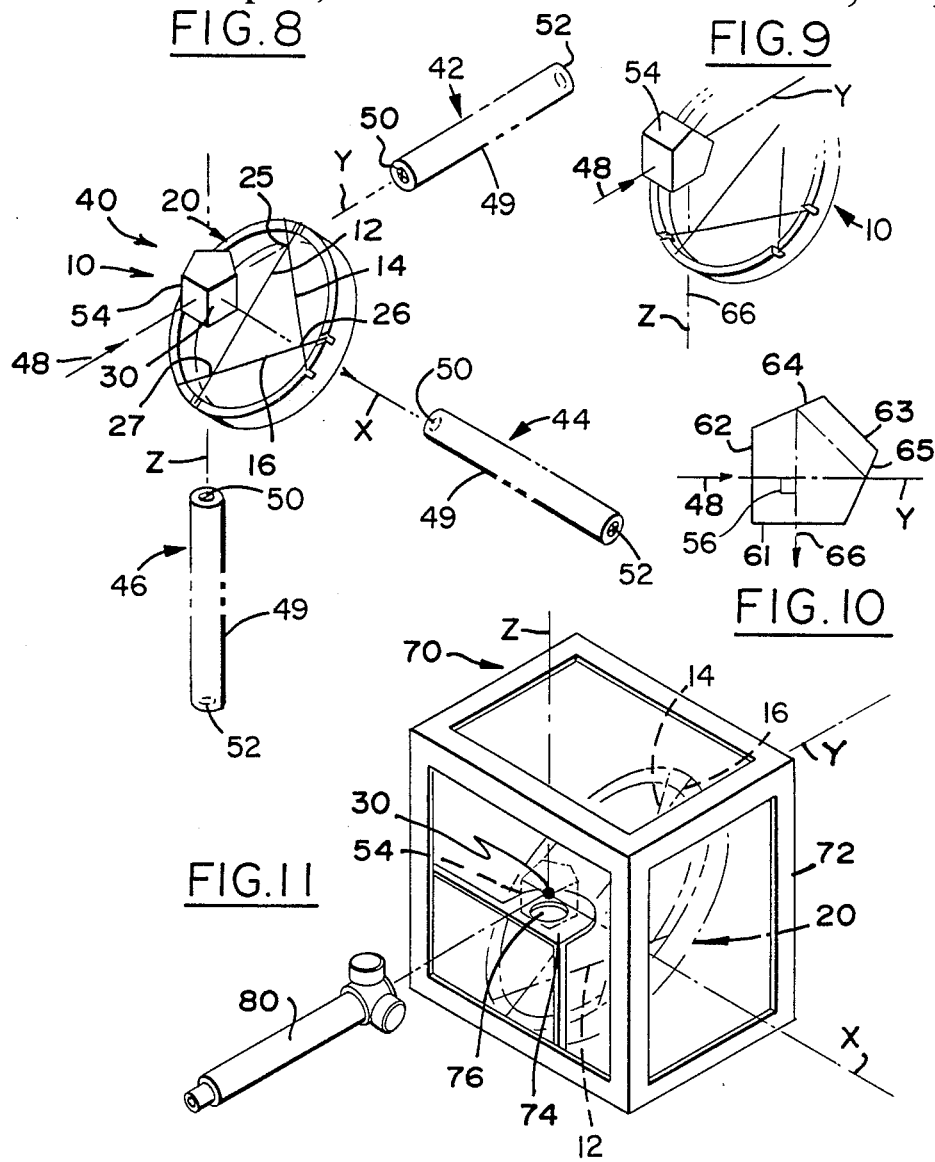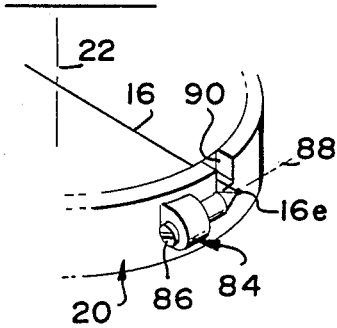

4,957,357

MULTIPLE AXIS RETICLE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457)

TECHNICAL FIELD

This invention relates to optical alignment and to apparatus for enabling optical alignment along a plurality of orthogonal axes having a common intersection point.

BACKGROUND OF THE INVENTION

When an aircraft model is tested in a wind tunnel, test data is often sought on the forces (normal side, and axial) and moments (yaw, pitch, and roll) exerted on the model. An apparatus for measuring these forces and moments is called a balance. Prior to usage in a wind tunnel, the balance must be calibrated. One commercial device made for calibrating balances applies adjustable calibration forces to the outer body of the balance and repositions the balance back to a central reference point to compensate for changes in alignment due to the applied forces. The user of the calibration device must position and measure the calibration forces. In order to achieve a total error of 0.1% or less, the applied forces need to be accurately known to about 0.03%, and the position and direction that the forces are applied must be known to approximately 0.001" and 0.002 degrees, respectively. To assure that the normal, side and axial calibration forces are pure and do not interact with each other or produce erroneous moments, the normal, side and axial forces must pass through the central reference point and be mutually perpendicular.

Reticles which include cross hairs are widely used for optical alignment. The following U.S. patents, for example, disclose cross hair reticles: 730,016, Hein; 1,189,422, Bodmer; 2,466,724, Meyer; and 4,380,876, Strassburg. These reticles are intended for single, not multiple axis optical alignment. The principal object of this invention is to provide a reticle which uses a minimum number of filaments or cross hairs and permits the precise alignment of up to three orthogonal axes that cross at a common target point.

SUMMARY OF THE INVENTION

In accordance with the present invention, a reticle apparatus is provided for optically aligning three perpendicular axes that cross at a mutual target point. The reticle includes three linear filaments mounted on a frame in such a manner that each filament is contained in a different imaginary orthogonal plane. The filaments are arranged on the frame so that when they are viewed from the frame axis, the filaments form a triangle with a V extending from each triangle vertex. When two overlapping filaments are viewed from a properly aligned axis, the segments of the filaments adjacent the overlap region (a triangle vertex) take the form of a cross (two straight lines intersecting at a right angle). A sighting device comprising two registered reticles or an alignment telescope facilitates the alignment of each axis. A pentaprism or a cube mirror is used to establish the perpendicular relationship between axes. If the overlapping filaments are viewed from an optical axis other than the alignment axis, the filaments will appear to intersect at an oblique angle, not a right angle. Thus, misalignment can be discerned.

The advantages and features of the invention should be more readily apparent to those skilled in the art after review of the following more detailed description of the invention, taken together with the drawings.

BRIEF DESCRIPTION OF THE DRAWINGS

FIG. 1 is a front elevation view of a reticle apparatus constructed in accordance with the present invention.

FIG. 2 is a perspective view of the reticle apparatus of FIG. 1.

FIG. 3 is a side elevation view of the apparatus of FIG. 2.

FIG. 4 is a perspective view indicating the positioning of the cross hair elements of the apparatus of FIG. 2 with respect to alignment axes X, Y, and Z.

FIG. 5 is a view of the apparatus of FIG. 1 taken along the X axis of FIG. 4.

FIG. 6 is a view of the apparatus of FIG. 1 taken along the Y axis of FIG. 4.

FIG. 7 is a view of the apparatus of FIG. 1 taken along the Z axis of FIG. 4.

FIG. 8 is a perspective view of the apparatus of FIG. 2 showing its use with a pentaprism and three alignment devices to make the X axis perpendicular to the Y axis.

FIG. 9 is a partial perspective view of the apparatus of FIG. 8 to make the Y axis orthogonal to the Z axis.

FIG. 10 is a plan view of the pentaprism of FIG. 8.

FIG. 11 is a simplified perspective view showing how the pentaprism of FIG. 8 can be supported relative to reticle 10.

FIG. 12 is a partial perspective view of the frame showing the filament adjustment apparatus.

DETAILED DESCRIPTION OF THE INVENTION

Figure 13:
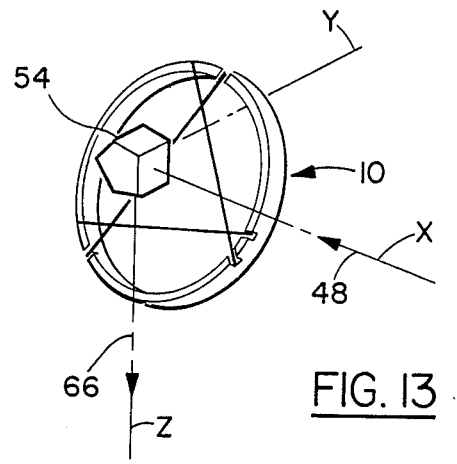
FIG. 13 is a partial perspective view of the apparatus of FIG. 8 depicting the orthogonal alignment of the X and Y axes.

FIGS. 1-3 illustrate a reticle apparatus 10 which can be used to align three mutually orthogonal axes that intersect at a common target point 30. The reticle includes three straight, thin filaments 12, 14, and 16. The preferred filament material is metal, however, other materials may be used. The filaments 12, 14 and 16 are mounted on a frame 20 which has a frame axis 22. The manner in which the ends of the filaments are preferably supported and adjusted is depicted in FIG. 12. The particular frame 20 illustrated is a short section of a cylinder, and the axis 22 is the cylindrical axis, although a variety of frame shapes can be used. The filaments are mounted on the frame 20 so that the filaments appear as a triangle 24 with a V 17 extending or protruding from triangle vertexes 25, 26, and 27 when the filaments are viewed along frame axis 22.

FIG. 4 illustrates the spatial arrangement of filaments 12, 14, and 16 and three mutually orthogonal axes X, Y, and Z that intersect at common target point 30. Axes X and Y are contained in plane or flat surface $S_{xz}$ and axes Y and Z are contained in plane or flat surface $S_{yz}$ which is normal to plane $S_{xy}$. Although filaments 14 and 16 are depicted touching in FIG. 4 it is to be understood that filament 14 can occupy any position within surface $S_{xy}$ as long as the ends of the filament extend beyond axes X and Y and the filament does not coincide with either axis X or axis Y. For example, filament 14 can be located at position 18 within surface $S_{xy}$. It is preferred that the filaments do not touch each other so that the positioning adjustment of one filament will not affect the other filaments. Likewise, filaments 12 and 16 can occupy different positions within orthogonal planes $S_{yz}$ and $S_{xz}$, respectively. From this explanation it should be clear that triangle 24 will always have acute angles, that there are many combinations of acute angles available, and that an equilateral triangle will be formed for only one particular arrangement of filaments. FIGS. 5-6 are views of reticle 10 along the three orthogonal axes X, Y and Z, respectively. In FIG. 5, axis X is perpendicular to the figure at vertex 26 and target point 30 (not shown in this view) would be located in front of vertex 26 (on axis X). In FIG. 6, axis Y is orthogonal to the figure at vertex 25 and target point 30 (not shown) would be situated behind vertex 25 (on axis Y). In FIG. 7, axis Z is normal to the figure at vertex 27 and target point 30 (not shown) would be located in front of vertex 27 (on axis Z).

Inasmuch as filament 14 is contained in a plane ($S_{xy}$) perpendicular to the plane containing filament 16 (plane $S_{xz}$), angle 23 (FIG. 5) must appear as a right angle to a person sighting along axis X and the four segments of filaments 14 and 16 next to axis X will appear as a cross. As used herein, "cross" means a figure formed by two straight intersecting perpendicular lines. If filaments 14 and 16 are viewed along an optical axis other than one coinciding with axis X, angle 23 will be other than a right angle (acute or obtuse) and the segments of filaments 14 and 16 adjacent axis X will not appear as a cross. Such a condition indicates misalignment.

Likewise, when a sighting is made along axis Y (FIG. 6), the segments of filaments 12 and 14 adjacent to axis Y will appear as a cross. For different optical axes of viewing, the filaments 14 and 12 will not appear normal to one another. When a sighting is made along axis Z (FIG. 7), the portions of filaments 12 and 16 next to axis Z will appear as a cross. If filaments 12 and 16 are sighted from a different optical axis, the filaments will not appear to be orthogonal. Such a condition indicates misalignment. Thus, when reticle 10 is viewed along an alignment axis X, Y, or Z, a cross is seen centered on the alignment axis. If misalignment exists, the filaments of the reticle will appear to be intersecting obliquely.

Figure 14:
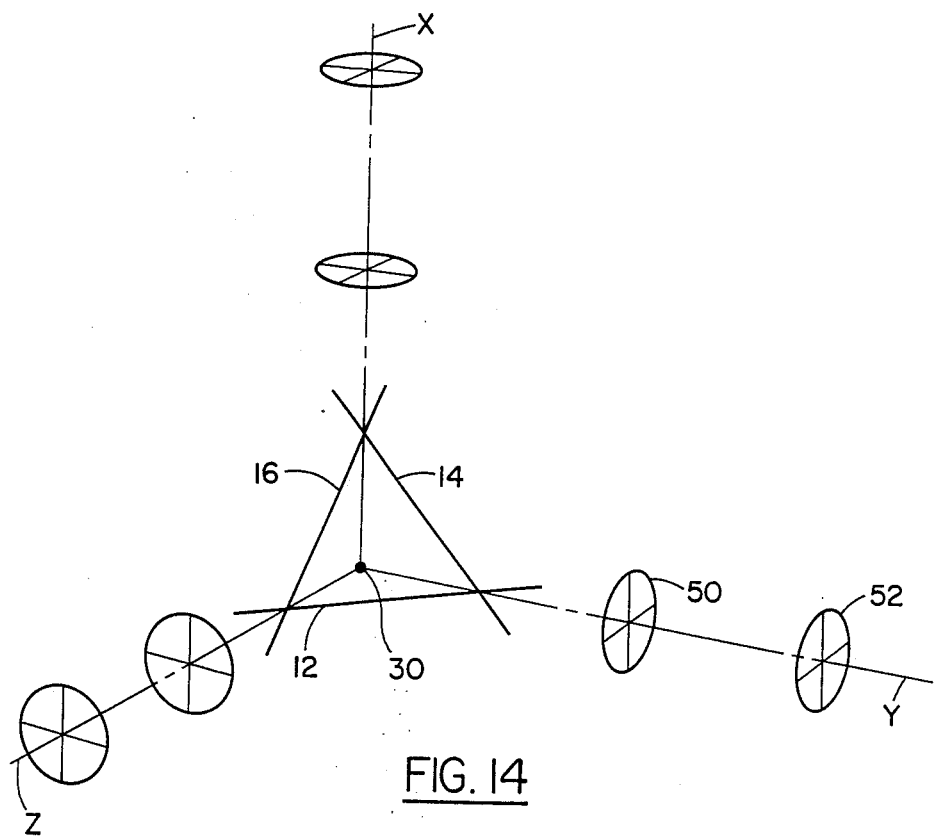
FIG. 14 is a perspective view of the three perpendicular axes, reticles 50 and 52, and the three filaments.

FIG. 8 illustrates a setup that can be used to align sighting devices 42, 44, and 46 along three orthogonal axes X, Y, and Z having a common intersection point 30. The frame 20 which holds the filament elements 12, 14, and 16 is oriented in the same manner as in FIG. 4 with each filament intersecting the alignment axes as in FIG. 4. That is, filament 12 intersects axis Y (at one point) and axis Z (at one point), filament 14 intersects axis Y and axis X, and filament 16 intersects axis X and axis Z. Sighting devices 42, 43, and 46 are the devices desired to be ligned in three mutually orthogonal axes having a common intersection point. The sighting devices could be, for example, mounted respectively on the three load struts that are included in a calibration device that supports and applies calibration forces to a wind tunnel balance. Sighting devices 42, 43, and 46 each comprise cross-shaped reticles 50 and 52 and a housing, platform, or frame 49 that spaces the reticles and maintains them in parallel, registered relationship. Housing 49 further centers and aligns the reticles 50 and 52 on an optical axis so that one sighting along the axis sees one reticle superimposed on and in registration with the other. FIG. 14 is a perspective view that just shows the spatial relationship of the three pair of reticles 50, 52 and the three filaments 12, 14, 16 to the axes X, Y, and Z. When the optical axis sighting device 42 is in alignment with axis Y, a person viewing reticle 10 and sighting device 42 observes a cross (centered at vertex, FIG. 6) in alignment with reticles 50 and 52. When the optical axis of sighting device 44 is oriented to be in alignment with the X axis, a person viewing reticle 10 and sighting device 44 will see the cross centered at vertex 26 (FIG. 5) in registration with reticles 50 and 52 of device 44. Also, when the optical axis of sighting device 46 is positioned to be in alignment with axis Z, a person viewing sighting device 46 and reticle 10 will observe that the cross made by filaments 12 and 16 and centered at vertex 27 (see FIG. 7) will be in correlation with reticles 50 and 52, of device 46. To establish perpendicularity among the three axes, a conventional pentaprism 54 is placed at the target point 30 where the three alignment axes X, Y, and Z meet. A pentaprism turns light 90 degrees regardless of the light entry position or entry angle (within limits). A pentaprism has seven faces or sides, including five sides 61-65. Sides 64 and 65 are the reflection sides and sides 61, 62 are the entry/exit sides. A light beam 48 entering face 62 of the pentaprism 54 will be emitted face 61 via direction 66. The angle between directions 48 and 66 is a right angle 56 irrespective of whether the input beam 48 is normal or oblique to face 62. Likewise, a light beam entering face 61 will) exit face 62 normal to the entrance direction.

Initially, the pentaprism is removed from the target point to enable a user to sight along direction 48 (coinciding with the Y axis). The sighting of the crosses and reticles maybe accomplished with an alignment telescope 80 (see FIG. 11). Sighting device 42 is aligned until the cross made by filaments 12 and 14 coincides with reticles 50 and 52 of device 42. Next, the pentaprism is placed as shown in FIG. 8 so that the line of sight is turned 90°, parallel to the X axis. The pentaprism can either be translated along the Y axis until the exit line of sight 66 coincides with the X axis or the optical micrometer of telescope 80 can be adjusted to shift the line of sight until the pentaprism output axis 66 coincides with the filament cross centered at vertex 26. When this is done, output axis 66 thus coincides with (or defines) the X axis, and sighting device 44 is oriented until reticles 50 and 52 register with the cross made by filaments 14 and 16 (which cross is centered on the X axis).

After alignment on the X axis is completed, the pentaprism 54 is turned 90° as depicted in FIG. 9 so that the entrance line of sight coincides with the Y axis and the exit optical axis 66 is parallel to axis Z. The prism is moved laterally along the Y axis until axis 66 coincides with the Z axis or the sighting axis is translated with the optical micrometer in telescope 80 until the exit axis 66 of pentaprism 54 coincides with the Z axis. Then sighting device 46 is oriented until the cross formed by filaments 12 and 16 registers with reticles 50 and 52 of sighting device 46.

Lastly, to complete the alignment of the Z axis, the pentaprism 54 is turned 90° as depicted in FIG. 13 so that the prism entrance line of sight coincides with the X axis and the exit optical axes 66 is parallel to the Z axis. The pentaprism is then moved laterally until the exit line of sight 66 coincides with the Z axis, or the sighting axis is translated with the optical micrometer in telescope 80 until the exit axis 66 of pentaprism 54 coincides with the Z axis. Sighting device 46 is moved, as necessary, until the cross made by filaments 12 and 16 registers with reticles 50 and 52 of the sighting device. This completes the alignment of all three sighting devices along mutually perpendicular axes X, Y, and Z that intersect at the common target point.

FIG. 11 illustrates a set-up 70 which can be used to hold the pentaprism at the target point 30, and allow it to be translated along the X and Y axes. The apparatus includes a mount 72 which forms a positioning means that positions the frame 20 so the filaments are oriented as indicated in FIGS. 4 and 8. A prism supporting platform 74 with aperture 76 enables the pentaprism 54 to be located at target point 30. The platform 74 is parallel to plane $S_{xy}$, and aperture 76 provides an optical passage between the target point 30 and the Z-axis sighting device. An alignment telescope 80 of the type used by surveyors is used to facilitate the alignment of the crosses and the reticles 50, 52. The telescope preferable includes an optical micrometer for translating the optical axis of the telescope. Alignment scope Models 81, 83, and 381, manufactured by the Brunson Instrument Company, are each suitable,·for example, for use as alignment telescope 80.

FIG. 12 illustrates a filament adjustment device 84 for supporting and moving the end of a filament within its orthogonal plane. The adjustment device holds an end 16e of filament 16. The adjusting device is a micrometer screw device, which has a screw 86 that can be turned to move the filament 16e in a direction 88 that is perpendicular to the longitudinal axis of the filament 16 and also perpendicular to the axis 22 of the frame. The frame preferably includes six adjustment devices, one attached to each filament end, to enable precision positioning of the filaments. Adjustment device 84 is not shown in FIGS. 1–3. The frame has a relatively deep slot 90 at each end of filament 16, and a shallower slot 92 at the ends of the filament 14. This arrangement allows the filaments to die in slightly spaced planes, to avoid interference of one filament with another. One model made in accordance with the invention utilized a stainless steel wire 0.002" in diameter for the filaments.

Figure 15:
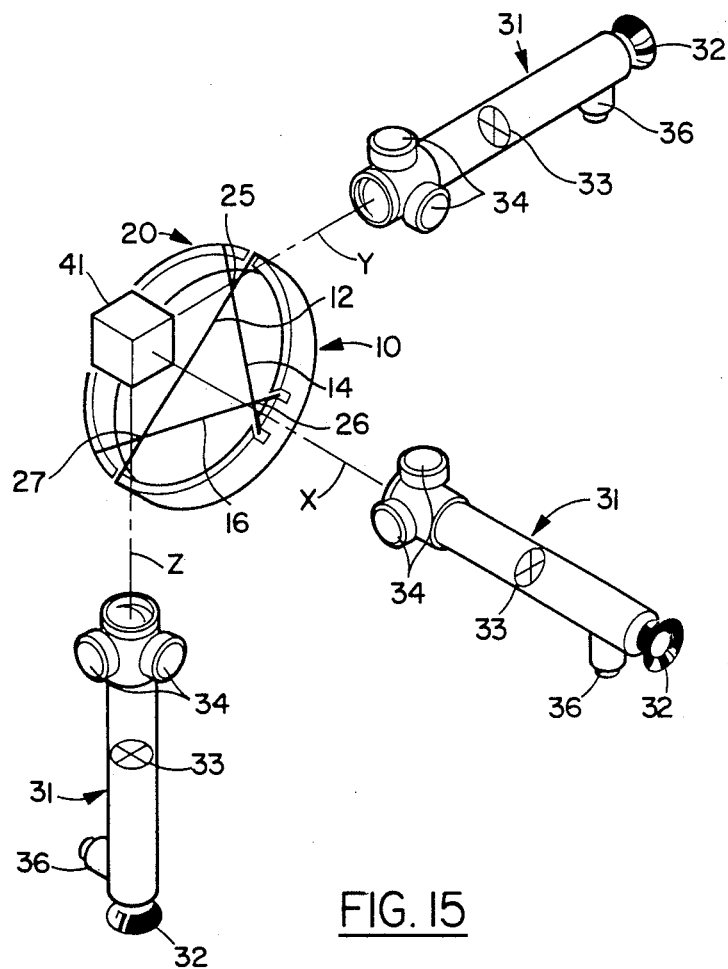
FIG. 15 is a perspective view of an alternate embodiment of the invention.

FIG. 15 shows a perspective view of an alternate embodiment of the invention. A cube mirror 41 replaces pentaprism 54 and is located at target point 30. The mirror is a cube of material, such as sintered carbide, having minimally three mirrored surfaces which are mutually orthogonal. A suitable cube mirror is, for example, Model 284 manufactured by Brunson Instrument Company, Kansas City, Mo. 64129. Three alignment telescopes 31 including eye pieces 32, lamps 36, reticles 33, coordinate optical micrometers 34 and auto-collimation capability are positioned on axes X, Y, and Z, respectively. Suitable alignment telescope are manufactured by the Brunson Instrument Company (for example, the Model 75 telescope with the Model 192 auto-collimation unit and Model 160 coordinate optical micrometer). When an auto-collimation telescope is focused on a reflecting surface, the viewer sees a crosshair reticle 33 and a reflected reticle image (projected by a lamp 36 in the telescope). When the scope is oriented precisely perpendicular to the reflecting surface, the reticle and the reflected reticle image are exactly in register. One by one, each alignment telescope 31 is auto-collimated with the surface of the mirror cube 41 that faces it. An optical micrometer utilizes a pivoted optical flat to displace the line of sight in a telescope. The optical flat is pivoted when a calibrated drum is turned and the amount of displacement is read in thousandths of an inch either side of zero on the drum. A coordinate optical micrometer enables the telescope line of sight to be displaced in two orthogonal axes. After the sighting devices 31 are auto-collimated, the optical micrometers 34 are used for final axial alignment. The user of the sighting device on the X axis adjusts the optical micrometer 34, as necessary, until the telescope reticle 31 registers with the cross formed by filaments 14 and 16. When the reticle 31 and filament cross are in registration, telescope 31 is aligned with the X axis. The same·procedure is used to align Y and Z axes. In this embodiment one sighting device may be used for the complete alignment. After alignment of the X axis is complete, the sighting device may be moved to the Y axis and so forth until all three axes are aligned. In this embodiment the cube mirror may be supported on platform 74 (of frame 72) above aperture 76.

Thus, it is seen that the invention provides a single reticle capable of providing the optical alignment of three mutually perpendicular axes that intersect at a common point. The reticle only requires three filaments and the filaments may be disposed in a number of configurations. Accordingly, many different frame and filament options are possible. Further, the reticle can be scaled so that ample space is available in the vicinity of the target point.

Although particular embodiments have been described and illustrated herein, it is recognized that modifications and variations may readily occur to those skilled in the art and consequently it is intended to cover such modifications and equivalents.

What is claimed is:

1. A three-axis reticle comprising a frame having an axis, three straight filaments supported by said frame, each filament occupying a different orthogonal plane, and said filaments arranged to form, as viewed along the frame axis, a triangle with a V extending from each triangle vertex.

2. A three-axis reticle as set forth in claim 1 further including adjustment means for moving each filament within its respective plane.

3. A three-axis reticle as claimed in claim 2 wherein said adjustment means includes a micrometer screw device coupled to each filament end for moving the corresponding filament end in a direction perpendicular to the longitudinal axis of the filament.

4. A three-axis reticle as set forth in claim 1 wherein said frame has a cylindrical shape.

5. A three-axis reticle as described in claim 1 wherein said triangle is an equilateral triangle.

6. A reticle for aligning three orthogonal axes that intersect at a common point comprising: a frame having an axis, three straight filaments supported by said frame in spaced apart relationship, each filament occupying a different orthogonal plane and intersecting two of the three orthogonal axes, and said filaments arranged to form, as viewed along the frame axis, a triangle with a V extending from each triangle vertex.

7. Apparatus for aligning three orthogonal X, Y, and Z axes that intersect at a common target point comprising: a reticle having a frame with first, second, and third straight filaments supported thereon; said first, second and third filaments occupying orthogonal planes that contain said X, Y, and Z axes, respectively; said frame having an axis and said filaments appearing, when viewed along said frame axis, to form triangle with a V extending from each triangle vertex; said reticle, when viewed along each of the orthogonal axes, presenting an image of a cross centered on one of said vertexes.

8. Apparatus as set forth in claim 7 including means for sighting along each of the three orthogonal axes.

9. Apparatus as described in claim 8 further including a pentaprism and a support for positioning said pentaprism at said target point, said pentaprism enabling sighting from one orthogonal axis to another.

10. Apparatus as set forth in claim 8 wherein a cube mirror is located at said target point and said sighting means includes means for autocollimating on three sides of said cube.

11. Apparatus as claimed in claim 7 further including adjustment means for moving each filament within its respective plane.

12. Alignment apparatus for aligning three orthogonal X, Y, and Z axes which intersect at a common target point comprising: a frame, first, second, and third linear wire filaments each having first and second end portions, said filaments being supported by said frame, said first filament occupying a a plane containing said Y and Z axes, said second filament occupying a plane containing said X and Z axes, said third filament occupying a plane containing said X and Y axes, said first end portion of said first filament and said second end portion of said third filament intersecting said Y axis, said second end portion of said first filament and said first end portion of said second filament intersecting said Z axis, said second end portion of said second filament and said first end portion of said third filament intersecting said X axis whereby the filament end portions form a cross when viewed along the orthogonal axis which they intersect.

13. Alignment apparatus as set forth in claim 12 including means for sighting along each of the three orthogonal axes.

14. Alignment apparatus as described in claim 13 further including a pentaprism and a platform for positioning said pentaprism at said target point, said pentaprism enabling sighting from one orthogonal axis to another.

15. Alignment apparatus as described in claim 13 wherein a cube mirror is located at said target point and said sighting means includes means for autocollimating on the three sides of said cube associated with the X, Y, and Z axes, respectively.

16. Alignment apparatus as set forth in claim 12 further including means for positioning each wire within its respective plane.

17. Alignment apparatus as described in claim 16 wherein said positioning means includes a micrometer screw device coupled to each wire end for moving the corresponding filament end in a direction normal to the wire longitudinal axis.

18. Alignment apparatus as set forth in claim 12 wherein said frame has a cylindrical shape.

19. Alignment apparatus as set forth in claim 12 wherein said triangle is an equilateral triangle.

* * * * *